J. H. MODLER.
OIL RETAINER FOR BEARINGS.
APPLICATION FILED FEB. 25, 1913.
1,189,853.
Patented July 4, 1916.
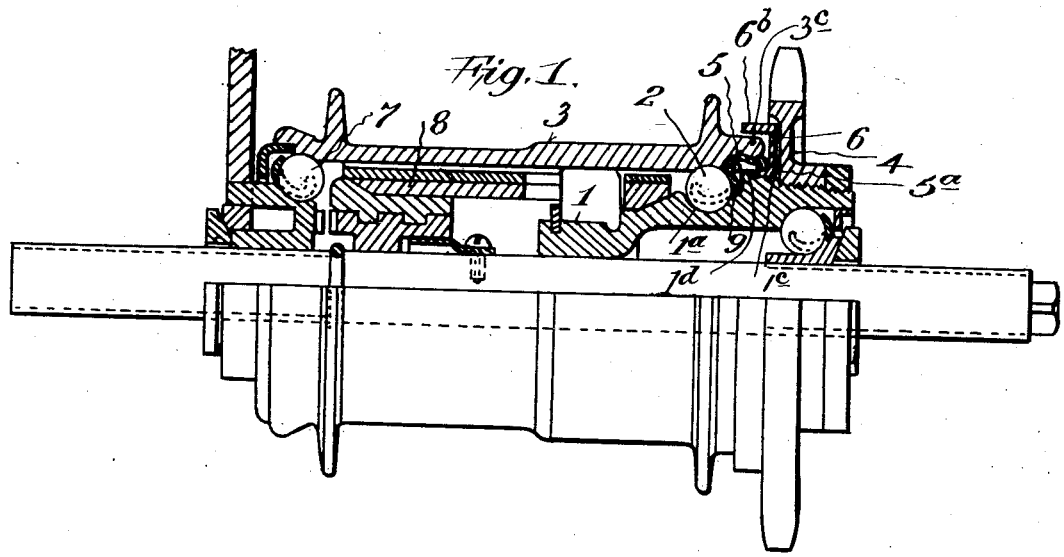
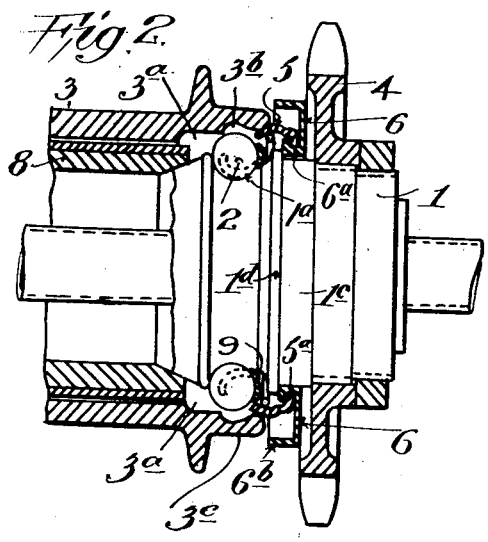
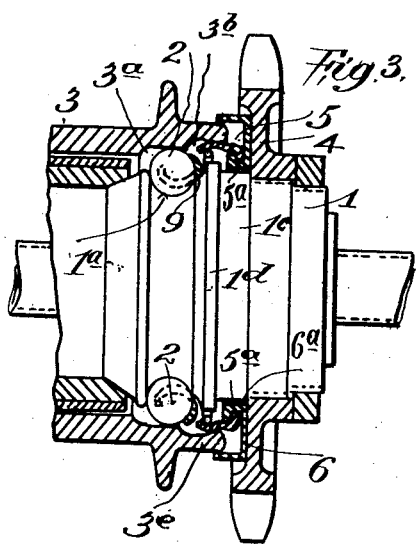
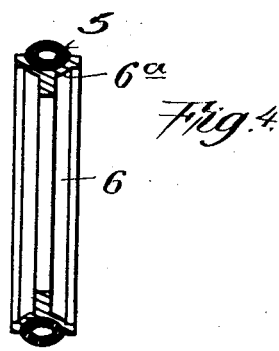
Inventor
J. H. Modler
By his Attorney
P. F. Bourne

UNITED STATES PATENT OFFICE.

JOHANN H. MODLER, OF SCHWEINFURT-ON-THE-MAIN, GERMANY.

OIL-RETAINER FOR BEARINGS.

1,189,853.  Specification of Letters Patent.  Patented July 4, 1916.

Application filed February 25, 1913. Serial No. 750,465.

*To all whom it may concern:*

Be it known that I, JOHANN H. MODLER, a subject of the Emperor of Germany, and resident of Schweinfurt-on-the-Main, Germany, have invented certain new and useful Improvements in Oil-Retainers for Bearings, of which the following is a specification.

The object of my invention is to provide improved means to retain the lubricating oil in bearings having anti-friction balls or rollers, and is particularly applicable to hub-bearings for bicycles and the like.

I have shown my invention as embodied in a coaster-brake hub for bicycles having anti-friction balls.

My invention comprises novel details of construction and combination of parts that will be more fully hereinafter set forth and then pointed out in the claims.

Reference is to be had to the accompanying drawings forming part hereof, wherein, Figure 1 is a partly sectional side view of a wheel-hub equipped with my improvements; Fig. 2 is a detail sectional view, showing the position the parts assume in being separated; Fig. 3 is a similar view, showing the position of the parts when being assembled, and Fig. 4 is a detail sectional view of a modification.

Similar numerals of reference indicate corresponding parts in the several views.

The numeral 1 indicates an inner bearing member having an outer raceway $1^a$ for the anti-friction balls 2, and 3 indicates a barrel of a hub to which the spokes are adapted to be attached, the barrel being provided with an inner raceway $3^a$, to receive the balls 2, all of which parts are of any wellknown construction.

The drive wheel or sprocket 4 is attached to bearing 1, as by screw threads or in any wellknown manner. The barrel 3, beyond the raceway $3^a$, is provided with a suitably-shaped inner annular recess $3^b$, which is larger in diameter than raceway $3^a$ and adapted to receive an annular resilient or spring-like oil retainer 5. In Figs. 1, 2 and 3 the retainer 5 is shown in hollow form, and provided at its outer end with an inwardly extending flange $5^a$ adapted to fit within the recess $6^a$ of a cup-like protector 6, whose rim or flange portion $6^b$ is adapted to fit over the end portion $3^c$ of barrel 3, the latter thereby lying between said flange $6^b$ and the oil retainer 5, as shown in Fig. 1.

The inner portion of protector 6 fits upon an annular portion $1^c$ of bearing member 1 so as to have free movement thereon and between shoulder $1^d$ on bearing 1 and the wheel or sprocket 4. The bearings 2, 7, brake 8, ball retainer 9, and other parts of the hub shown form no part of my present invention, but are illustrated to show the relation of my invention to a hub of the character disclosed.

The main parts of the mechanism illustrated may be assembled and removed by pushing them into and withdrawing them from barrel 3 in a wellknown manner. When such parts, with my improved oil retaining devices in position thereon, (as shown in Fig. 3) are to be assembled, the wheel or sprocket 4 will push the protector 6, which in turn will push the oil-retainer 5 into the recess or groove $3^b$ while the balls 2 are being pushed into the raceway $3^a$, whereby the parts will be assembled as shown in Fig. 1. When the parts are to be separated and bearing 1 is pulled out with wheel 4, the shoulder $1^d$, by bearing against the protector 6, will pull the latter and the oil retainer 5 outwardly, as shown in Fig. 2. The retainer 5, being resilient, will spring into and out of recess $3^b$, as required. It will thus be understood that by means of my improvements the retainer 5, resting in the recess $3^b$, and being connected with the cup-like protector 6, serves to keep lubricating oil retained in the bearing, when the parts are assembled as in Fig. 1, since the retainer 5 may fit snugly in the recess $3^b$ and at its flange $5^a$ in the recess $6^a$ of protector 6, and also by means of my improvements dust is excluded from the bearing. The part $6^a$ of protector 6, by fitting freely on the surface $1^c$ enables the retainer 5 and protector 6 to rotate by engagement with the barrel.

In Fig. 4 the oil retainer 5 is shown in the form of an annular resilient ring fitted in the peripheral recess $6^a$ of the ring-like protector 6, that is adapted to fit upon an annular surface of bearing 1, such as the surface $1^c$, and, as previously described, said retainer is adapted to fit in the hub recess $3^b$.

Having now described my invention what I claim is:—

1. The combination of a hub barrel having an inner recess, with a spring-acting retainer adapted to fit said recess, and a protector connected with said retainer and located adjacent to the end of the barrel at the outer part of the retainer.

2. The combination of a hub barrel having an inner recess, with a spring-acting oil retainer adapted to fit said recess to rotate with the hub barrel, and a dust-protector adjacent to the end of the hub barrel, said protector having an inward flange and an annular recess to be connected with said retainer said protector being located without said retainer.

3. The combination of a hub barrel having a recess, with an oil-retainer adapted to snugly fit said recess to rotate with the barrel, and a dust protector adjacent to the end of the hub barrel, said protector being connected with the retainer, said protector having an outer flange overhanging the end of said barrel.

4. The combination of a hub barrel having an inner recess, with a spring-acting retainer adapted to fit snugly in said recess, a protector connected with said retainer, and shoulders carried by the axle on opposite sides of said retainer and protector, said retainer and protector being adapted to rotate freely between said shoulders.

5. The combination of a hub-barrel having an inner recess, with a spring acting oil retainer, adapted to fit snugly in said recess, and a dust protector connected with said retainer and overlying the end of the barrel, and a member receiving said retainer and protector and having shoulders on opposite sides thereof adapted to cause the retainer and protector to be pushed against and pulled from the barrel by and with said member.

Signed at New York city, in the county of New York, and State of New York, this 3rd day of February, A. D. 1913.

JOHANN H. MODLER.

Witnesses:
 D. J. CUFFORT,
 T. F. BOURNE.